Dec. 19, 1933.  L. W. BROWNE  1,939,658
LEAK LOCK
Filed April 18, 1932
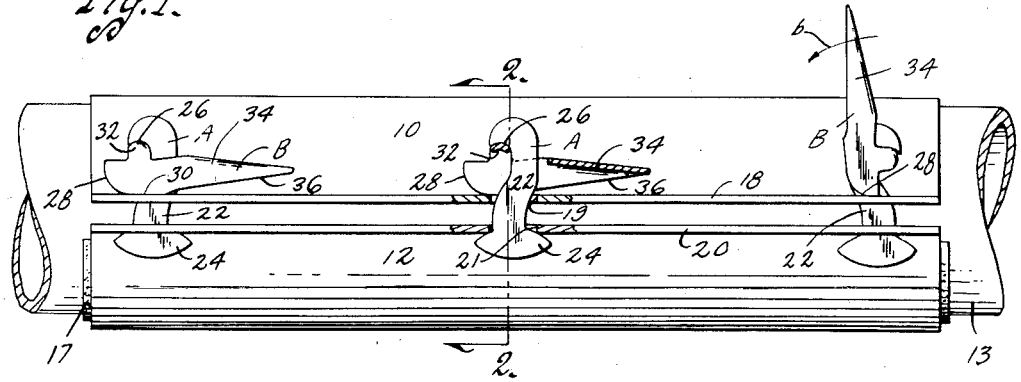
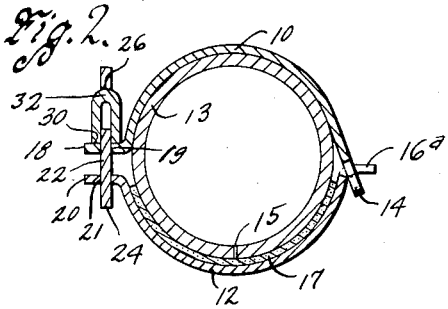
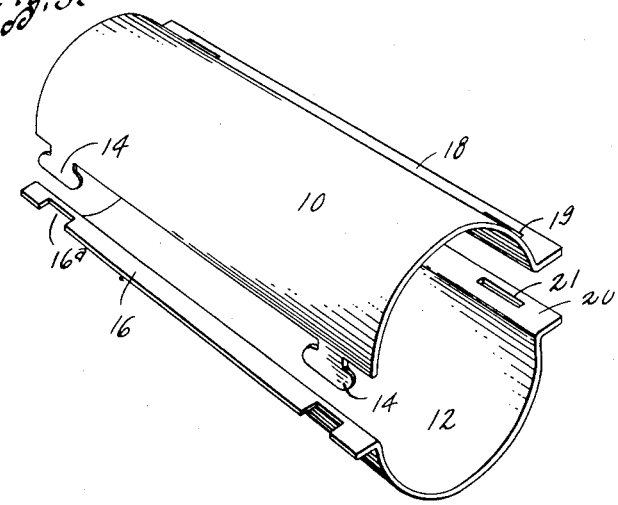
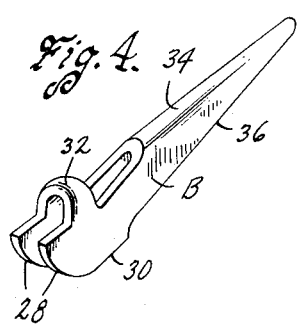
Witness
H. S. Munzenmaier
Inventor
Lyle W. Browne
by Bair, Freeman & Sinclair
Attorneys Patented Dec. 19, 1933

1,939,658

UNITED STATES PATENT OFFICE 1,939,658

LEAK LOCK

Lyle W. Browne, Marshalltown, Iowa

Application April 18, 1932. Serial No. 605,986

3 Claims. (Cl. 137—99)

One object of my invention is to provide a leak lock for leaks in pipes, couplings, bell ends and/or the like, which is of simple and durable construction and which may be readily and quickly manipulated to prevent leakage in a pipe or coupling which has sprung a leak.

A further object is to provide a leak lock comprising a pair of semi-cylindrical members adapted to encircle a pipe or the like, with a gasket between the pipe or coupling and one of the members and covering a leak in the pipe or coupling and I provide novel means for connecting the two members together.

More particularly, it is my object to provide clamping means for the semi-cylindrical members comprising a pair of elements coactable with each other and arranged so that they can be quickly manipulated for clamping the semi-cylindrical members together.

An additional object is to provide a clamping means consisting of a special locking element and a U-shaped cam element having a portion coactable with part of the headed element.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a pipe with my leak lock applied thereto.

Figure 2 is a vertical sectional view on the line 2—2 of Figure 1.

Figure 3 is a perspective view of the semi-cylindrical members of the leak lock.

Figure 4 is a perspective view of a handle element of the clamping means; and

Figure 5 is a plan view of a modified form of clamping means.

On the accompanying drawing, I have used the reference numerals 10 and 12 to indicate semi-cylindrical pipe engaging members. The member 10 has one or more T-shaped projections 14 along one edge thereof, it being understood that the members 10 and 12 can be made in any length desirable and the longer ones have more of the projections 14. The projections 14 are adapted to hookingly engage notches 16a of a flange 16 formed on the member 12.

The members 10 and 12 at their opposite edges have flanges 18 and 20 provided with slots 19 and 21, respectively. The slots 19 and 21 are adapted to receive locking elements A with which cam locking elements B coact. When desired under some circumstances, ordinary nuts and bolts may be used. Each locking element A comprises a shank 22 and a head 24. The shank of the locking element A may be made flat or may be round in cross section. I prefer the latter structure. The head 24 is formed with its upper edge curved on the arc of a circle, so that the locking element may rock against the surface of the flange 20. The shank 22 as illustrated in Figure 1 is of such width or diameter as to permit this rocking and is preferably slightly curved as shown. Then the end of the shank 22 is provided with an overhanging portion 26 to cooperate with the cam locking element B.

Each clamping element B is preferably made of metal and is U-shape in cross section as clearly shown in Figures 2 and 4 of the drawing. Each element B has cam surfaces 28 at one end thereof terminating in flat surfaces 30. At one end of the member B, the closed end is cut away to leave a cross bar 32 provided for coaction with the abutment or notch 26 of the clamping element A. A handle 34 is provided as an extension of the parts 28, 30 and 32 and the edge 36 thereof, when the edge 30 is against the flange 18 as shown in Figure 1, is spaced from the flange to permit ready unclamping of the clamp.

My leak lock is adapted for preventing leakage in pipes or the like 13. In Figure 2 for instance, an opening is illustrated at 15 through which the fluid in the pipe would leak if it were not for the leak lock. A gasket 17 of rubber or the like is interposed between the pipe 13 and the semi-cylindrical member 12 and the clamping elements A and B are in position for drawing the member 10 into engagement with the pipe 13 and the member 12 into engagement with the gasket 17 and consequently the gasket into tight engagement with the outer surface of the pipe 13 coupling or the like.

The projections 14 and the notches 16a provide for quick cooperation of two edges of the members 10 and 12 with each other. The clamping elements A and B provide for quickly clamping the other two edges of the members 10 and 12 together for holding the leak lock in proper leak prevention position on the pipe. The surfaces 28 being cam-shaped (which is illustrated by the right-hand clamp in Figure 1) provide for tightly pulling the members 10 and 12 toward each other by merely swinging the handle 34 in the direction of the arrow b. When the handle reaches the position shown at the left of Figure 1, the flat spot 30 retains it in this position and yet the edge 36 being spaced from the flange 18 allows for easy and quick return of the handle 34 to non-locking position when it is desired to remove the clamp.

The entire lock can be readily stamped from sheet metal as well as being made of cast metal, while the particular designs of the clamping elements A and B particularly lend themselves to a stamping type of product. The element B being U-shaped and thus formed double prevents any side strain on the parts when in locked position.

In Figure 5 I have shown clamping elements A' and B' which differ from the elements A and B in that the shank 22a and the head 24a are round, while the sides of the member B' are more widely spaced in order to accommodate the increased width of the element A'. Other portions of the clamp shown in Figure 5 corresponding to those of the previous figures are given the same reference numerals with the addition of the distinguishing character a.

The clamping means shown in Figure 5 is particularly adapted for substitution in the openings of flanges or other devices where ordinarily bolts are used.

Some changes may be made in the construction and arrangement of the parts of my device without departing from the real spirit and purpose of my invention, and it is my intention to cover by my claims, any modified forms of structure or use of mechanical equivalents, which may be reasonably included within their scope. For example, instead of the member 20, a saddle may be substituted when it is desired to remove contents from a pipe. By the use of the word "openings" in my claims 1 intend to include holes or notches.

I claim as my invention:

1. In a leak lock, a channel shaped member of semi-cylindrical form having outwardly projecting flanges at its edges, provided respectively with notches and with slots, a second cooperating semi-cylindrical channel-shaped member, having at one edge T-shaped tongues to cooperate with said slots and having at the other end an outwardly projecting flange, provided with slots, locking elements having curved shanks adapted to extend through slots in the respective members having heads at one end with curved faces to engage and rock on one of the flanges and hook-like members at the other end, and channel-shaped clamping devices having at one end cam faces terminating in flat faces, and spaced cross bars and slots adjacent the cross bars to receive the hook-like members.

2. In a leak lock, a pair of channel-shaped semi-cylindrical members, having edges with cooperating engaging means and edges with outwardly extending flanges provided with slots, locking elements having curved shanks adapted to extend through slots in the respective members having heads at one end with curved faces to engage and rock on one of the flanges and hook-like members at the other end, and channel-shaped clamping devices having at one end cam faces terminating in flat faces, adapted to seat against said one flange, when the pair of members are clamped together, for serving to lock the parts in place, against accidental movement of the locking elements, and spaced cross bars and slots adjacent the cross bars to receive the hook-like members.

3. In a leak lock, a pair of channel-shaped semi-cylindrical members, having edges with cooperating engaging means and edges with outwardly extending flanges provided with slots, locking elements adapted to extend through said slots, having heads at one end and hook members at the other, and channel-shaped clamping devices having at one end cam faces terminating in flat faces, adapted to engage one of the flanges, to lock the members together and prevent accidental movement of the locking elements and spaced cross bars and slots adjacent the cross bars to receive the hook-like members.

LYLE W. BROWNE.